Jan. 3, 1956    L. M. DECKER    2,729,734
FEED DEVICE FOR REACTION VESSELS
Filed Aug. 3, 1953    2 Sheets-Sheet 2

INVENTOR.
LEWIS M. DECKER
BY *Kenneth Swartwood*
ATTORNEY

United States Patent Office 2,729,734
Patented Jan. 3, 1956

2,729,734

FEED DEVICE FOR REACTION VESSELS

Lewis M. Decker, Baton Rouge, La., assignor to Ethyl Corporation, New York, N. Y., a corporation of Delaware Application August 3, 1953, Serial No. 372,139

6 Claims. (Cl. 219—19)

This invention relates to apparatus for carrying out chemical reactions. More particularly, the invention relates to a method and apparatus for introducing at an elevated temperature a liquid or molten feed material to a pressurized reactor vessel or autoclave. Even more particularly, the invention is directed to a method of feeding and a feed device for introducing a molten reactive metal feed component to an autoclave wherein a reaction is carried out at an appreciably lower temperature than required to maintain the feed component in liquid state.

In carrying out reactions wherein one or more of the reactants are capable of being introduced in the liquid phase, but require heating to temperatures appreciably elevated above the operating temperature, it has been found that difficulty frequently arises because of the wide spread between those temperatures. In addition, it has been found that upon interruption of operation, and temporary cessation of flow of such a component, that there is a tendency for the material to react in part with vapors of the other components of the reaction and to form a plug at the inlet for the high melting component which prevents readily re-establishing feed and flow.

A typical example of reactions in which the present invention is highly useful involves the ethylation of an alloy of an alkali metal and lead with a liquid ethylating agent. Typical of such reactions is the formation of tetraethyllead by the reaction of ethyl chloride and monosodium lead alloy, such an alloy containing ten per cent sodium and ninety per cent lead by weight. Such ethylations are conducted at temperatures usually below 100° C. whereas the alloys employed melt at above 370° C. The tetraethyllead produced by such an ethylation is necessarily maintained at a moderate temperature in order to prevent the decomposition and consequently the depression of recoverable product yields. Accordingly, apparatus successfully employable for carrying out such an ethylation, and for feeding the said alloy in liquid phase, must assure the maintenance of temperature of the alloy, but concurrently it is highly undesirable that the reaction vessel itself be heated to above 100° C. In addition provision must be made to provide for satisfactorily heating up a solidified alloy which is present when the process has been interrupted, or for discharging plugs resulting from the reaction of vaporized ethylating agent and the molten alloy.

Accordingly, a principal object of the present invention is to provide a method and apparatus for feeding a high melting and liquid feed component to a pressurized reaction zone. A more specific object is to provide means for supplying heat to the stream of said high melting material while avoiding undue temperature rises of the reaction vessel walls. An additional object is to provide apparatus which provides a uniform heat flux to a high melting liquid feed component in its path to a pressurized reaction zone, plus a more intense heat flux to the feed, uniformly distributed around the said stream at the point of entry to the reaction zone. A further object is to provide apparatus wherein such thermal requirements are satisfied, but concurrently the strength necessary to permit operation at the elevated pressures required is maintained. A further object is to provide such an apparatus which is particularly susceptible of mechanical cleaning.

The apparatus and method of the invention is more fully described below and shown by the accompanying figures, wherein.

Generally, the invention includes the method of feeding a high melting liquid reactant to a pressurized reaction zone and supplying heat to the liquid during its passage into the reaction zone. The heat is applied to this stream as a uniform heat flux in a portion of its path preceding its actual entry, but at the point of entry and immediately adjacent thereto the heat flux is more intense and is provided entirely and is substantially uniformly around the periphery of the feed stream. A preferred apparatus for the process comprises, in combination, an electrically conductive conduit of uniform cross section leading from a supply source or line into the interior of the reaction space. A second member, also of electrically conductive material is attached to the conduit at the end or discharge point within the reaction space, and surrounds the portion of the conduit within the reaction space. This member is in turn affixed to a flange member, through which the conduit passes. The conduit, however, is electrically insulated from the flange member. The conduit, apron, concentric cylinder and flange provide an electrical circuit which provides substantial benefits described in more detail below. The space between the conduit, apron, concentric cylinder, and flange is virtually filled in preferred embodiments by a snugly fitting generally annular shaped electrically and thermally insulating body.

Figure 1:
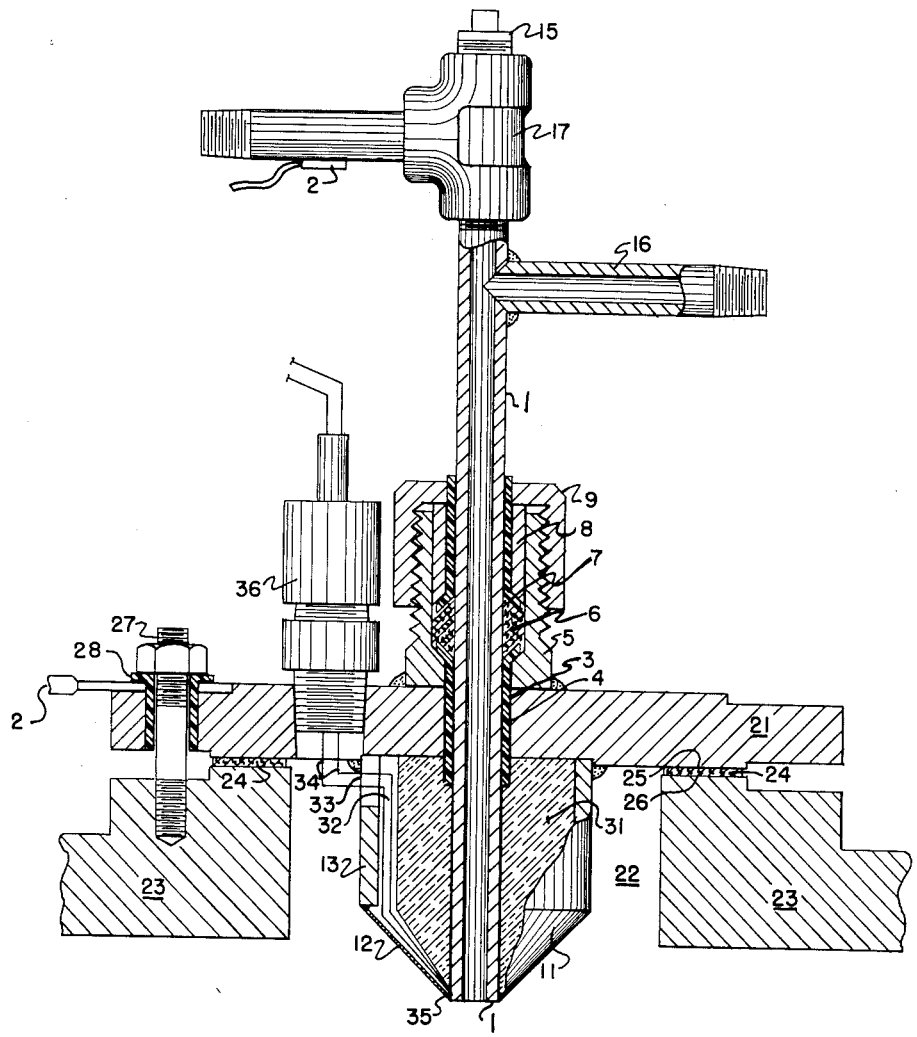
Figure 1 is a sectional elevation showing a typical apparatus installed in the wall opening of a pressurized reaction vessel.

A preferred embodiment of the apparatus employed is illustrated by Figure 1. Referring to Figure 1, the principal components of the assembly include a feed conduit 1, and a surrounding member 11. The member 11 may be in a variety of forms, the present embodiment including an inverted frusto-conic section 12, and a relatively short cylindrical section 13. The frusto-conic section 12 is joined by welding or equivalent means, to the conduit 1 and the cylindrical section 13, the cylindrical section 13 being joined to the flange 21. Electrical leads 2 affixed to the conduit 1 and to the flange 21 provide for passing electrical current through a circuit comprising the conduit 1, the surrounding member 11 and the flange member 21.

The conduit 1 passes through a hole 3 in the flange 21 but is insulated therefrom electrically by a machined bushing 4 of a non-conductive material. A threaded nozzle 5 is welded to the flange 21 and forms a channel for the extension of the conduit and provides a base for a pressure and electrical sealing combination. The means employed for obtaining electrical and thermal isolation include a packed portion 6 of finely divided electrically insulating material, a second machined sleeve or bushing 7 of electrically insulating material, surrounded by a metal compressing sleeve 8, snugly fitting in the threaded nozzle 5, a follower 9 engaging a thread on the nozzle 5 forces the machined sleeve 7 downwardly to compress the finely divided electrically insulating material 6 into a state of high densification, thereby providing a pressure tight connection.

The space defined by the conduit 1, the surrounding member 11, and the flange 21 is filled almost completely by a snugly fitting plug or shape 31, fabricated of a material both electrically and thermally insulating such as mica or phenolic resin shapes. In preferred embodiments, a narrow slot 32 is machined into the surface of the plug 31. This slot is positioned adjacent a notch or opening 33 in the cylinder 13, thereby providing a channel for thermocouple wire leads 34. The thermocouple 35 used in such instances is then positioned immediately adjacent the discharge point from the conduit 1. The thermocouple wires 34 are led from the apparatus, through the flange member 21 by a conventional pressure tight fitting 36.

The apparatus generally is mounted in an opening 22 in the head 23 of a reaction vessel. An electrically insulating gasket 24 prevents metal-to-metal contacts of the flange face 25 and the face 26 of the reactor opening. A pressure tight closure is provided by the threaded fastenings 27, electrical insulation being provided by a bushing 28 of insulating material.

Provision is preferably made for mechanical cleanout of the conduit 1 by a T 17. Removal of a plug 15 in the T permits cleanout of the conduit with a straight instrument. A supplementary branch conduit 16 permits introducing other materials, such as an inert gas, into the system when desired.

As previously mentioned an electrical current is established through the apparatus by the leads 2. Current flows through the conduit 1, the frusto-conic section 12 and cylindrical section 13 of the member 11 surrounding the portion of the conduit 1 within the reaction space, and the flange member 21.

In operation electrical current is passed through the above defined circuit and at such an amperage as to assure that there will be no solidification of the liquid material feed, regardless of the speed of flow therein. A particular significant factor in the apparatus is the provision of a variant cross sectional conductive area to assure that a high temperature is assured at a point critical in the operation. Accordingly, the frusto-conic portion 12 of the section 11 is of relatively thin metal, of such a gage that the entire cross section at the point of attachment to the conduit 1 is appreciably below the cross sectional area of conduit wall.

There is no absolute limitation on the relative cross sectional areas of the conduit 1, and of the current transmitting area immediately adjacent the conduit, except that in all cases, the latter area is less than the cross sectional area of the conduit wall. A preferred range of this area ratio is from 0.9:1 to 0.5:1, a specific and preferred embodiment having a ratio of about 0.75:1. It will be understood that the cross sectional area of the surrounding member 11 here referred to is the area immediately adjacent to the conduit terminal point, and is measured at right angles to the direction of electrical current flow.

Figure 2:
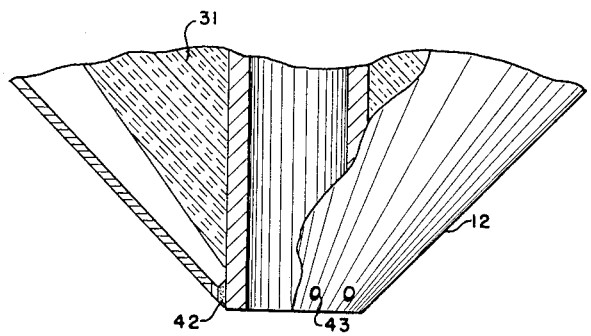
Figure 2 is an enlarged section showing details of construction of a typical embodiment adjacent the terminus or discharge point of the feed conduit within the reaction space.

The foregoing requirement is quite rigid although the precise numerical value thereof is not absolutely critical. Further, the effect of ratio can be affected to some extent by the mode of attachment of the apron section to the conduit proper. In most instances, it will be preferred to separately fabricate these portions and to attach one to the other by a fillet weld. An example of such a mode of construction is illustrated by Figure 2, being an enlarged cross section of the tip of the conduit showing such construction. Referring to Figure 2, the conduit 1 and apron 12 are joined together by weld metal 42. In order to assure a reduced cross section and compliance with the above stated area requirements, drilled perforations 43 are made in the apron immediately adjacent the conduit 1. This construction assures that a localized high temperature region will be provided where absolutely essential.

Figure 3:
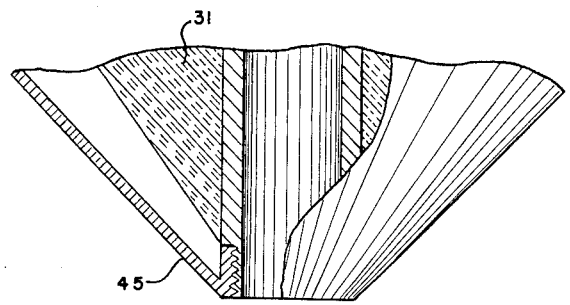
Figure 3 is also an enlarged section showing details of construction of an additional embodiment and particularly adjacent the discharge point from the feed conduit.

An alternative variety of construction is shown by Figure 3 which avoids the use of weld metal. Referring to Figure 3, in this embodiment, the apron is machined with a central portion 45 of a diameter equivalent to that of the main body conduit 1 and having a threaded portion for attachment to a corresponding threaded portion on the conduit 1. In such embodiments, perforations or mechanical weakening of the wall 12 immediately adjacent the conduit is unnecessary. However, as explained hereafter, in all varieties of the apparatus, at least one perforation is provided therein for purposes hereafter stated.

In still another mode of construction the conduit 1 itself has a reduced cross sectional area portion at the point of discharge, whereby the necessary localized high temperature region is attained.

The materials of construction for the operative portions of the apparatus are not limited except insofar as they must be suitable electrical conductors. An additional requirement is that the materials should resist corrosion from the reaction atmosphere. Frequent usage is therefor made of mild steel, or of alloys such as the non-ferrous cuprous metals or stainless steel alloys. These latter are particularly desirable where temperature conditions are severe.

An important feature of the construction above described is the safety provision for high pressure reactions. The normal pressure seal is that provided by the compression of the finely subdivided inorganic material 6 around the wall of the conduit as already described. However, even the best packing arrangements on occasion will develop leaks. The design and position of the filler block 31 assures that if such leaks develop the necessarily thin wall section 12 will not collapse because of the pressure differential thereby established. As heretofore mentioned, the presence of at least one perforation in the entire wall section also assures that this portion of the apparatus will not be called upon to retain pressure by its own strength, even if a perfect fit is not obtained by the plug 31 in the space between the conduit 1 and surrounding member 11.

Another important aspect of the apparatus is the provision for ascertaining the temperature thereof at the critical operating point, that is the point of emergence from the conduit to the reaction space. Provision is so made by the groove 32 in the filler block 31 for the thermocouple wires 34. The groove 32 is sufficiently deep so that the exterior temperature within the reactor will not affect the observed temperature obtained through the thermocouple 35.

In the normal operations, the proportions of the conduit are such that the feed material, already in a fluid state, will pass through at such a rate that a low rate of heat addition is used. Upon termination of flow or shutdown of operations, the supply of material to the feed line 22 is interrupted. When the material so fed is of fairly high density, the feed conduit 1 may empty in whole or in part, by gravity flow. However, in most instances, a thin film of liquid will be retained on the wall of the conduit 1 and it will thus be possible for reaction to occur if the other components of the reacting mixture are volatilizable. To remedy this possible feature, line 16 is provided to the conduit 1, whereby an inert flushing gas can be introduced as desired. Thus, on termination of flow, a flow of inert gas (e. g., nitrogen, argon or the like) is immediately started at a sufficient rate to sweep remnants of the feed liquid from the tube. As a further feature to provide easy maintenace, provision is made by the plug 15 for introducing a straight cleaning tool into the conduit 1 for a thorough clean out.

On start-up operations, it is usually advisable to start the flow of electric current through the circuit. When the temperature of the conduit, and particularly of its extremity, is above the melting temperature of the feed liquid flow is then started with the assurance there will be no freezing even at low rates.

The method and apparatus of the invention are applicable to a wide variety of components for reactions necessarily carried out under pressure. Thus, it is suitable for processing high melting organic materials, waxes, resins, gums, or normally crystalline compounds. In addition, inorganic salts or mixtures thereof can be beneficially fed by this invention. A particularly useful adaptation comprises the feed of a molten alkali metal lead alloy to an alkylation reaction. A typical example of such an embodiment follows.

*Example*

A supply of molten mono-sodium lead alloy consisting of 10 weight per cent sodium and 90 weight per cent lead is provided to the conduit 1 which has for example an internal diameter of approximately one-fourth inch. The alloy is fed at the linear rate of approximately one to ten feet per second. Alternating current is introduced through the electrical leads 2 and passes through the conduit 1, the apron 12, a cylindrical section 13, and the flange 21 at the rate of 200 amperes. The alloy as initially supplied is at a temperature of approximately 400–450° C. The passage of the current as above described maintains a wall temperature in the conduit 1 of about 450° C., and the temperature maintained immediately adjacent of the conduit 1 and in the portion of the apron attached to the conduit 1 a temperature in the same range. A localized zone of intense heat flux is thus provided whereby any possible reaction products or by-products of vapor phase reaction are caused to melt and drip off the apparatus. Although the heat flux maintained at the terminus of the conduit 1 is appreciably greater than in the straight run of the conduit, the actual temperature does not vary greatly at this point, because of the presence within the reaction zone of vapors which rapidly absorb heat from the feed assembly, particularly the apron 12. In starting up, or in operation at low rates of flow, however, the temperature at the point of high heat flux is 10 to 20° C. above the normal wall temperature of the conduit 1.

It will be apparent that the apparatus is capable of numerous variations without departing from the scope of the invention, and that the invention is limited only by the subsequent claims.

I claim:

1. In a feed device for introducing a high melting material into a pressurized reaction space, the apparatus comprising a conduit terminating within said reaction space, an annular member surrounding the portion of said conduit within the reaction space and affixed thereto at the end of said conduit, the annular member having a cross sectional area immediately adjacent the end of said conduit less than the cross sectional area of the conduit wall, the conduit and annular member defining a space, a filler block of thermally and electrically non-conductive material snugly fitting into such space, a flange member surrounding the conduit and attached to the end of the member surrounding the conduit and pressure and electrical sealing means electrically insulating said conduit from the flange member, said conduit, conduit surrounding member, and flange member forming an electrical circuit whereby passage of electrical current therethrough generates heat at a uniform rate in the conduit and at an intense rate immediately adjacent the end of said conduit.

2. The apparatus of claim 1 further defined in that the surrounding member includes a frusto-conic section divergent upwardly from the terminus of the conduit, and a cylindrical section joining the frusto-conic section and the flange member.

3. The apparatus of claim 2 further defined in that the frusto-conic section is pierced for pressure equalization purposes.

4. The apparatus of claim 3 further defined in that the cross sectional area of the frusto-conic section, adjacent the terminus of the conduit has a cross section area of about 0.5 to 0.9 of the cross sectional area of the conduit wall.

5. In a feed device for introducing a high melting material into a pressurized reaction space having an atmosphere capable of reacting with the said material, the apparatus comprising a conduit terminating within said reaction space, an annular member surrounding the portion of said conduit within the reaction space and affixed thereto at the end of said conduit, said annular member having a wall cross sectional area immediately adjacent the end of the conduit less than the conduit wall, and a flange member surrounding the conduit and attached to the end of the member surrounding the conduit and pressure and electrical sealing means electrically insulating said conduit from the flange member, said conduit, conduit surrounding member, and flange member forming an electrical circuit having an area of reduced cross section immediately adjacent the discharge end of the conduit, whereby passage of electrical current through the said circuit generates heat at a uniform rate in the conduit and at an intense rate immediately adjacent the end of said conduit.

6. The apparatus of claim 5 further defined in that the wall of the annular member is pierced by a plurality of openings whereby the pressure is equalized in the reaction space and in the space defined by the conduit, annular member, and flange means.

References Cited in the file of this patent

UNITED STATES PATENTS

| | | |
|---|---|---|
| 964,722 | West | July 19, 1910 |
| 1,652,409 | Moulthrop | Dec. 13, 1927 |
| 1,684,112 | Roberts | Sept. 11, 1928 |
| 1,973,451 | Unger | Sept. 11, 1934 |
| 2,407,208 | Sherwood | Sept. 3, 1946 |
| 2,540,415 | Altman | Feb. 6, 1951 |
| 2,564,427 | Rugeris | Aug. 14, 1951 |
| 2,688,682 | Bell | Sept. 7, 1954 |

FOREIGN PATENTS

| | | |
|---|---|---|
| 944,518 | France | Nov. 2, 1948 |